United States Patent
Chakra et al.

(10) Patent No.: US 9,129,031 B2
(45) Date of Patent: *Sep. 8, 2015

(54) DYNAMICALLY CONFIGURABLE PORTLET

(75) Inventors: Al Chakra, Apex, NC (US); Adam R. Cook, Apex, NC (US); Ryan E. Smith, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 2126 days.

This patent is subject to a terminal disclaimer.

(21) Appl. No.: 11/846,617

(22) Filed: Aug. 29, 2007

(65) Prior Publication Data

US 2009/0064004 A1 Mar. 5, 2009

Related U.S. Application Data

(63) Continuation of application No. 11/846,586, filed on Aug. 29, 2007, now Pat. No. 8,943,432.

(51) Int. Cl.
*G06F 3/14* (2006.01)
*G06F 17/30* (2006.01)

(52) U.S. Cl.
CPC .................................. *G06F 17/3089* (2013.01)

(58) Field of Classification Search
USPC .......................... 715/200–277; 700/701–866;
345/30–111; 709/201–229, 246;
705/50–79, 1; 719/312, 329; 717/108
See application file for complete search history.

(56) References Cited

U.S. PATENT DOCUMENTS

| | | | |
|---|---|---|---|
| 5,387,981 A | 2/1995 | Orlen et al. | |
| 7,266,806 B2 * | 9/2007 | Choi et al. | 717/108 |
| 7,685,083 B2 * | 3/2010 | Fairweather | 706/45 |
| 7,703,022 B2 * | 4/2010 | Arthurs et al. | 715/742 |
| 7,840,707 B2 * | 11/2010 | Jerrard-Dunne | 709/246 |
| 8,015,240 B2 * | 9/2011 | Ng et al. | 709/202 |
| 2003/0128234 A1 | 7/2003 | Brown et al. | |
| 2003/0227487 A1 * | 12/2003 | Hugh | 345/777 |
| 2004/0183831 A1 * | 9/2004 | Ritchy et al. | 345/762 |
| 2004/0199541 A1 | 10/2004 | Goldberg et al. | |
| 2004/0230947 A1 * | 11/2004 | Bales et al. | 717/110 |
| 2005/0021765 A1 | 1/2005 | Flores et al. | |
| 2005/0198615 A1 * | 9/2005 | Choi et al. | 717/108 |
| 2006/0080612 A1 | 4/2006 | Hayes et al. | |
| 2006/0200751 A1 * | 9/2006 | Underwood et al. | 715/501.1 |
| 2007/0006083 A1 | 1/2007 | Daniels et al. | |

(Continued)

FOREIGN PATENT DOCUMENTS

| | | | |
|---|---|---|---|
| WO | 2004/031882 A2 | 4/2004 | |
| WO | 2005/106710 A1 | 11/2005 | |

OTHER PUBLICATIONS

PCT, "Notification of Transmittal of the International Search Report and the Written Opinion of the International Searching Authority, or the Declaration", Date of Mailing Dec. 15, 2008.

(Continued)

*Primary Examiner* — Ruay Ho
(74) *Attorney, Agent, or Firm* — Steven M. Greenberg, Esq.; CRGO Law

(57) ABSTRACT

An improved solution for portlets is provided. In an embodiment of the invention, a method of automatically configuring a portlet includes: receiving a portlet; searching content of the portlet for a contextual aspect; and automatically applying attribute information to a portlet window object based on a discovered contextual aspect.

12 Claims, 11 Drawing Sheets

(56) References Cited

U.S. PATENT DOCUMENTS

| | | | |
|---|---|---|---|
| 2007/0118394 A1* | 5/2007 | Cahoon | 705/1 |
| 2007/0219842 A1* | 9/2007 | Bansal et al. | 705/9 |
| 2008/0066079 A1* | 3/2008 | Nauerz et al. | 719/312 |
| 2008/0077595 A1* | 3/2008 | Leebow | 707/10 |
| 2008/0177848 A1* | 7/2008 | Wakhlu | 709/206 |
| 2008/0282186 A1* | 11/2008 | Basavaraju | 715/781 |
| 2009/0287775 A1* | 11/2009 | Ng et al. | 709/205 |
| 2009/0292800 A1* | 11/2009 | Ng et al. | 709/223 |
| 2011/0078708 A1* | 3/2011 | Dokovski et al. | 719/329 |

OTHER PUBLICATIONS

Hesmer et al., "Portlet Development Guide Working with the Portlet API 1.1", pp. 1-116, Apr. 2, 2002, URL: http://e.bis.business.utah.edu/resources/wps_project.htm.

Douglas De Vine, "White space / formatting", Date: Nov. 7, 2001, pp. 1-2, http://archive.gingerall.cz/archives/public/sablot2001/msg01537.html.

"Interface CSSProperty", pp. 1-5, http://www-act.ucsd.edu/bpi/ps/javadocs/vap/com/vignette/portal/text/processor/css/CSSProperty.html.

* cited by examiner

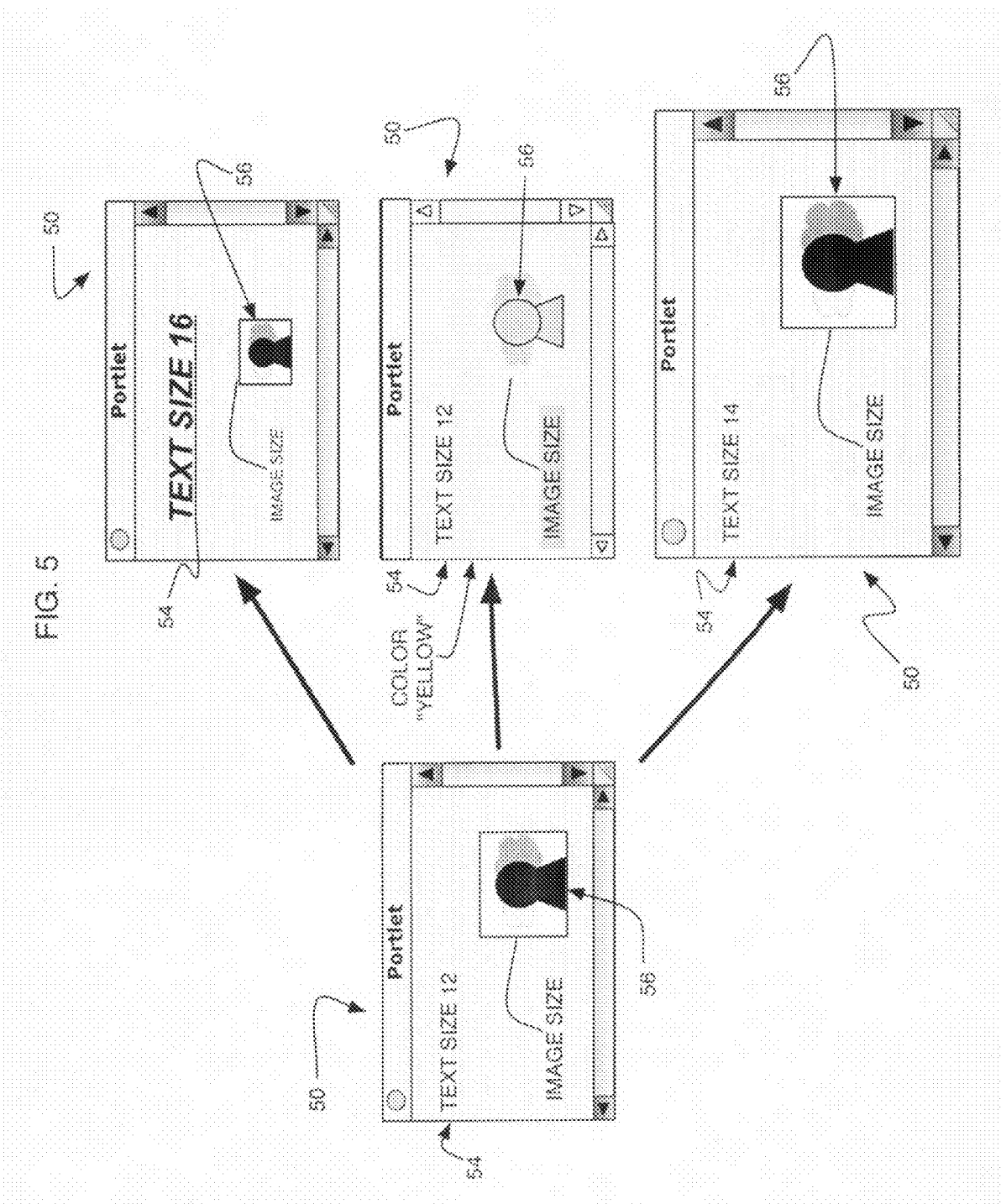

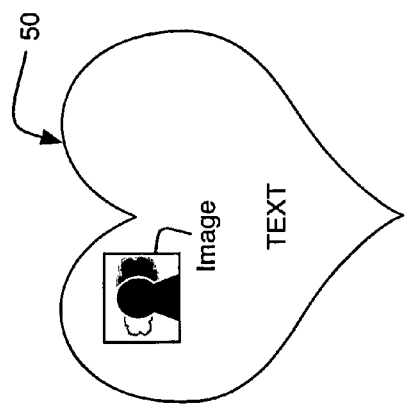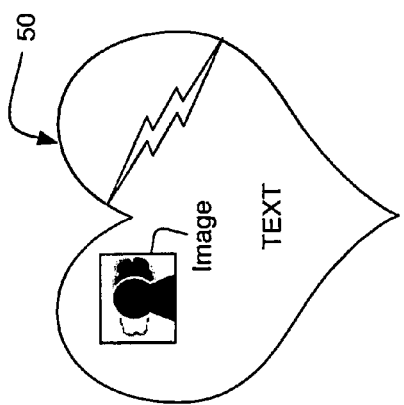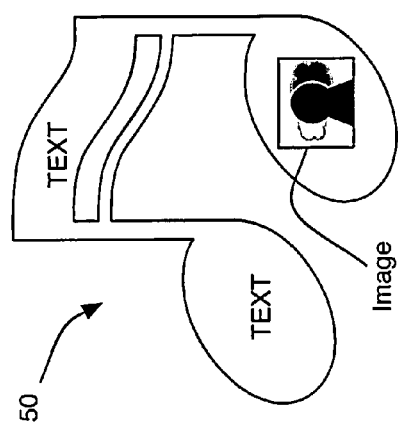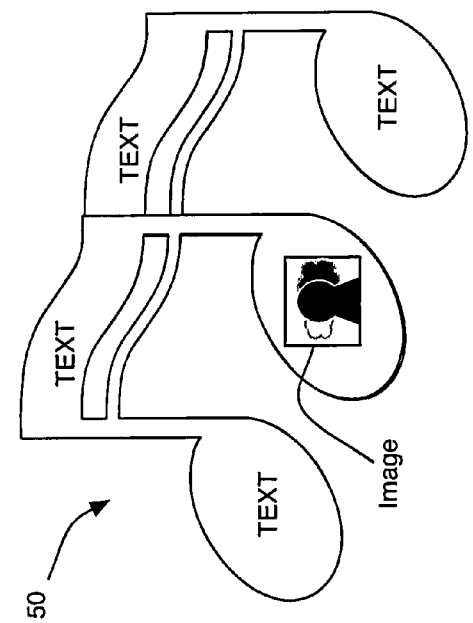

DYNAMICALLY CONFIGURABLE PORTLET

CLAIM OF PRIORITY

This continuation application clams priority to patent application Ser. No. 11/846,586, filed on Aug. 29, 2007 now U.S. Pat. No. 8,943,432, entitled "Dynamically Configurable Portlet", now U.S. Pat. No. 8,943,432, the contents of which is hereby incorporated by reference.

FIELD OF THE INVENTION

Aspects of the invention relate generally to portals and portlets and, more particularly, to a dynamically configurable portlet.

BACKGROUND OF THE INVENTION

The portlet space, or "drop zone", for portlets is typically just rows and columns which renders the portlet windows to be entirely rectangular in appearance. As a result, all portlets and concomitantly its portals have the same predictably boring and homogeneous look to them.

Further, since the inception of the portal concept, the marketing of portals and portlets has become increasingly challenging and ever competitive. Along with this growth and competition, portal server providers have grown in maturity and innovative functionality. The success in marketing of portal servers, no longer just hinges on functionality, but more often depends on presentation and consumability of the portal server and portlet experience.

Accordingly, there is an opportunity to improve upon the effectiveness of portals and portlets.

BRIEF SUMMARY OF THE INVENTION

Aspects of the invention provide an improved type of portlet.

A first aspect of the invention provides a method of automatically configuring a portlet, the method comprising: receiving a portlet; searching content of the portlet for a contextual aspect; and automatically applying attribute information to a portlet window object based on a discovered contextual aspect.

A second aspect of the invention provides a system for automatically configuring a portlet, the system comprising: a module for receiving a portlet; a module for searching content of the portlet for a contextual aspect; and a module for automatically applying attribute information to a portlet window object based on a discovered contextual aspect.

A third aspect of the invention provides a computer program comprising program code stored on a computer-readable medium, which when executed, enables a computer system to implement a method of automatically configuring a portlet, the method comprising: receiving a portlet; searching content of the portlet for a contextual aspect; and automatically applying attribute information to a portlet window object based on a discovered contextual aspect.

A fourth aspect of the invention provides a method of generating a system for automatically configuring a portlet, the method comprising: providing a computer system operable to: receive a portlet; search content of the portlet for a contextual aspect; and automatically apply attribute information to a portlet window object based on a discovered contextual aspect.

A fifth aspect of the invention provides a data processing system for automatically configuring a portlet, comprising: a processing unit; a bus coupled to the processing unit; and a memory medium coupled to the bus comprising program code, which when executed by the processing unit causes the data processing system to: receive a portlet; search content of the portlet for a contextual aspect; and automatically apply attribute information to a portlet window object based on a discovered contextual aspect.

A sixth aspect of the invention provides computer software embodied in at least one propagated signal for automatically configuring a portlet, the at least one propagated signal comprising instructions for causing at least computer system to: receive a portlet; search content of the portlet for a contextual aspect; and automatically apply attribute information to a portlet window object based on a discovered contextual aspect.

A seventh aspect of the invention provides a business method for managing a method for automatically configuring a portlet, the business method comprising: managing a network that includes at least one computer system that performs the process described herein; and receiving payment based on the managing.

The illustrative aspects of the invention are designed to solve one or more of the problems herein described and/or one or more other problems not discussed.

BRIEF DESCRIPTION OF THE SEVERAL VIEWS OF THE DRAWINGS

These and other features of the invention will be more readily understood from the following detailed description of the various aspects of the invention taken in conjunction with the accompanying drawings that depict various embodiments of the invention, in which:

FIG. 5 shows a portlet having various attribute information applied thereto according to embodiments of the invention.

FIGS. 8A-8D show various portlets underling reconfiguration according to embodiments of the invention.

It is noted that the drawings are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide an improved type of portlet. In an embodiment of the invention, a method of automatically configuring a portlet includes: receiving a portlet; searching content of the portlet for a contextual aspect; and applying attribute information to a portlet window object based on a discovered contextual aspect. As used herein, unless otherwise noted, the term "set" means one or more (i.e., at least one); and the phrase "any solution" means any now known or later developed solution.

Figure 1:
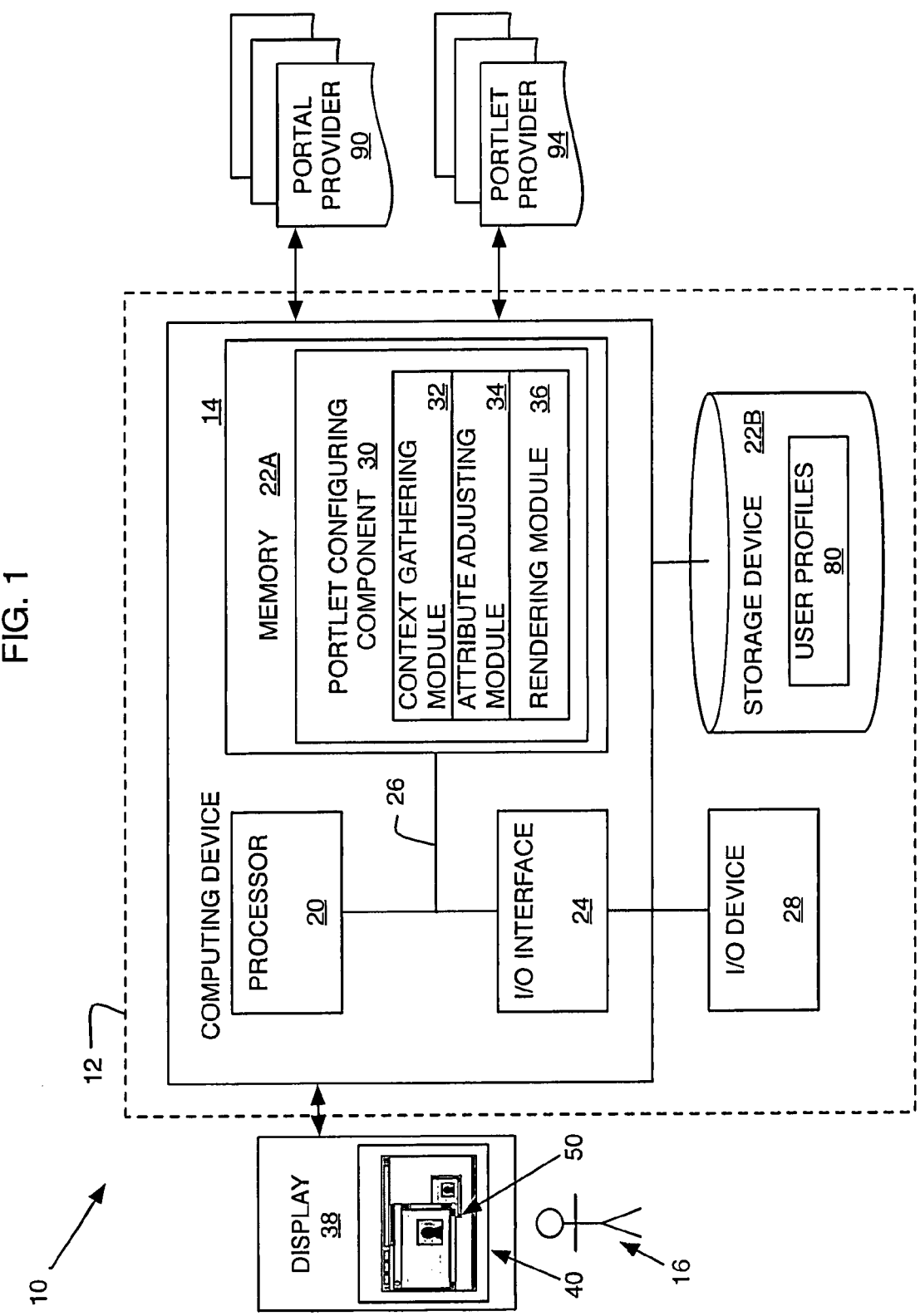
FIG. 1 shows an illustrative environment for employing dynamically configurable portlets according to an embodiment of the invention.

Turning to the drawings, FIG. 1 shows an illustrative environment 10 for configuring a portlet according to an embodiment of the invention. To this extent, environment 10 includes a computer system 12 that can perform the process described herein in order to configure portlets. In particular, computer system 12 is shown including a computing device 14 that comprises a portlet configuring component 30, which makes computing device 14 operable for configuring a portlet, by performing the process described herein.

Computing device 14 is shown including a processor 20, a memory 22A, an input/output (I/O) interface 24, and a bus 26. Further, computing device 14 is shown in communication with an external I/O device/resource 28 and a storage device 22B. In general, processor 20 executes program code, such as portlet configuring component 30, which is stored in a storage system, such as memory 22A and/or storage device 22B. While executing program code, processor 20 can read and/or write data, such as user profile(s) 80, etc. to/from memory 22A, storage device 22B, and/or I/O interface 24. Bus 26 provides a communications link between each of the components in computing device 14. I/O device 28 can comprise any device that transfers information between a user 16 and computing device 14 and/or other entities (e.g., portal provider 90, portlet provider 94, etc.) and computing device 14. To this extent, I/O device 28 can comprise a user I/O device to enable an individual user 16 to interact with computing device 14 (e.g., display 38) and/or a communications device to enable an entity (e.g., portal provider(s) 90, portlet provider(s) 94, etc.) to communicate with computing device 14 using any type of communications link.

In any event, computing device 14 can comprise any general purpose computing article of manufacture capable of executing program code installed thereon. However, it is understood that computing device 14 and portlet configuring component 30 are only representative of various possible equivalent computing devices that may perform the process described herein. To this extent, in other embodiments, the functionality provided by computing device 14 and portlet configuring component 30 can be implemented by a computing article of manufacture that includes any combination of general and/or specific purpose hardware and/or program code. In each embodiment, the program code and hardware can be created using standard programming and engineering techniques, respectively.

Similarly, computer system 12 is only illustrative of various types of computer systems for implementing aspects of the invention. For example, in one embodiment, computer system 12 comprises two or more computing devices that communicate over any type of communications link, such as a network, a shared memory, or the like, to perform the process described herein. Further, while performing the process described herein, one or more computing devices in computer system 12 can communicate with one or more other computing devices external to computer system 12 using any type of communications link. In either case, the communications link can comprise any combination of various types of wired and/or wireless links; comprise any combination of one or more types of networks; and/or utilize any combination of various types of transmission techniques and protocols.

As discussed herein, portlet configuring component 30 enables computer system 12 to automatically configure a portlet. To this extent, portlet configuring component 30 is shown including an context gathering module 32, an attribute adjusting module 34, and a rendering module 36. Operation of each of these modules is discussed further herein. However, it is understood that some of the various modules shown in FIG. 1 can be implemented independently, combined, and/or stored in memory of one or more separate computing devices that are included in computer system 12. Further, it is understood that some of the modules and/or functionality may not be implemented, or additional modules and/or functionality may be included as part of computer system 12.

Aspects of the invention provide an improved portlet that is dynamically configurable. To this extent, FIGS. 2 through 10B show various scenarios and aspects that may employ the computer system 12 of FIG. 1, according to embodiments of the invention. For example, a user 16 may wish to have rendered on a display 38 (FIG. 1) at least one portal page 40, provided by a portal provider 90, with at least one portlet 50 therein, provided by a portlet provider 94, for any purpose. In so doing, the user 16 can benefit by utilizing aspects of the present invention. The portal provider 90 may be any now known or later developed entity that is capable of providing portal pages. The portlet provider 94 may be any now known or later developed entity that is capable of providing portlets.

Aspects of the invention allow the computer system 12 employing portlet configuring component 30 to configure portlets. As a result, more dynamic and intuitive portlets and portals are generated for the user ultimately providing an entirely more robust, memorable, and enjoyable portal and portlet experience.

Figure 2:
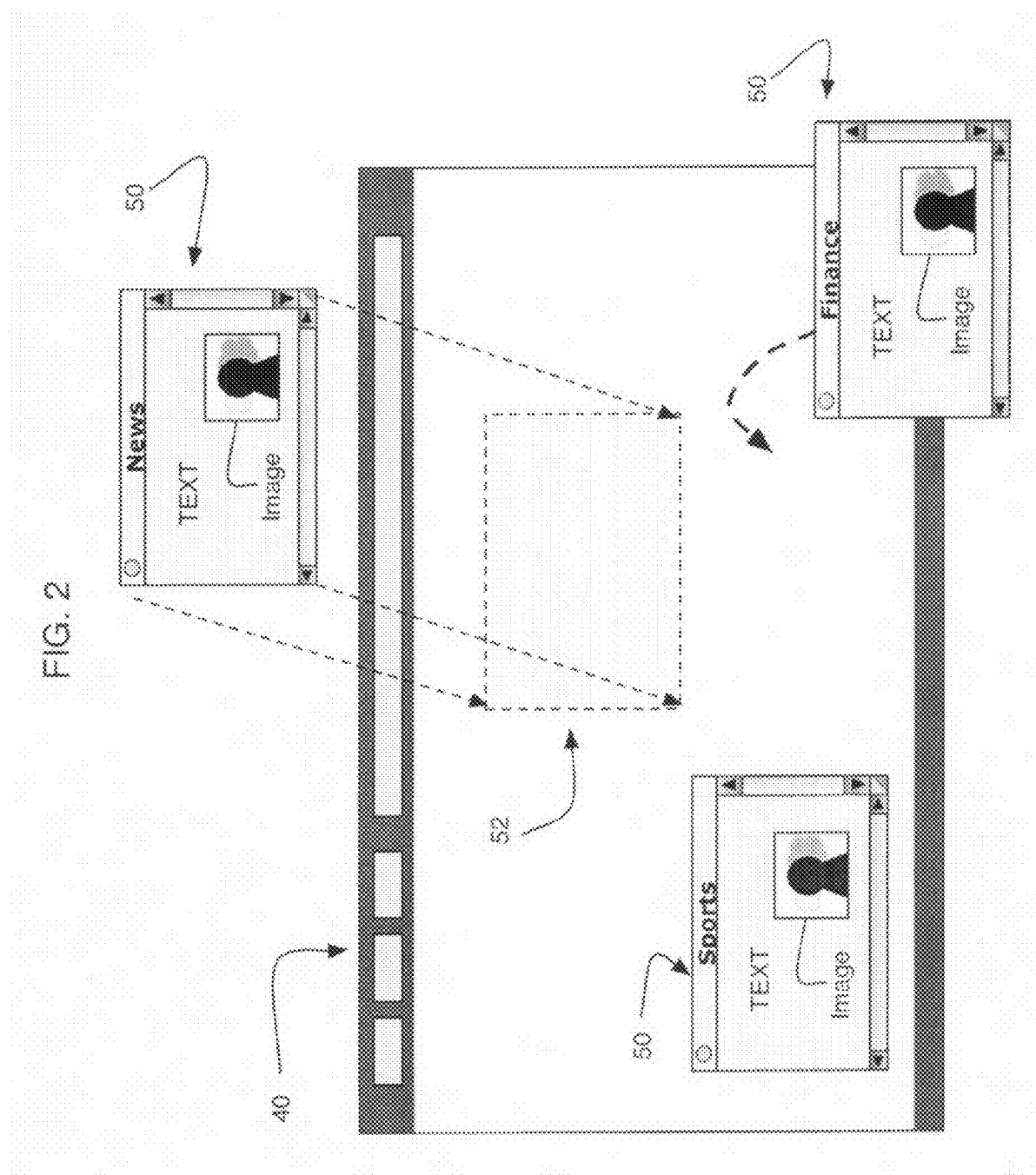
FIG. 2 shows a detailed view of a portal and portlets rendered by the environment shown in FIG. 1 according to an embodiment of the invention.

Referring to FIG. 2, a portal page 40 may include a plurality of portlets 50 that are ultimately rendered on a display 38 (FIG. 1). Various portlets 50 are arranged onto respective drop zones 52 thus providing the portal page 40 with a variety of information offered from the different portlets 50. Portlets 50 may include text, images, and/or a combination of both. Portlets 50 for "NEWS", "FINANCE", and "SPORTS" are shown for illustrative purposes only. Clearly, a variety of types, configurations, and quantities of portlets 50 may be rendered on the portal page 40.

Figure 3:
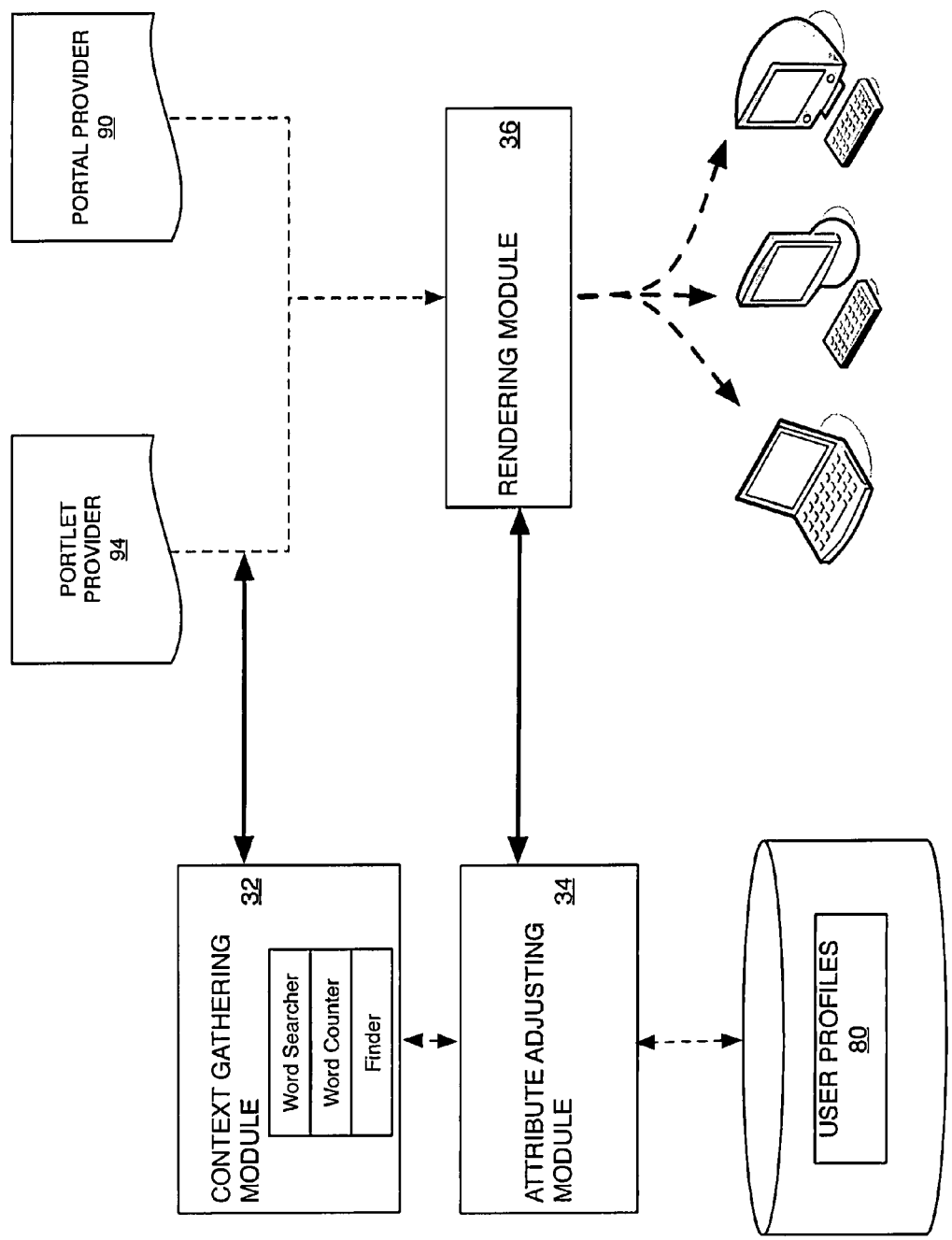
FIG. 3 shows a more detailed view of the illustrative environment in FIG. 1 according to an embodiment of the invention.
Figure 4:
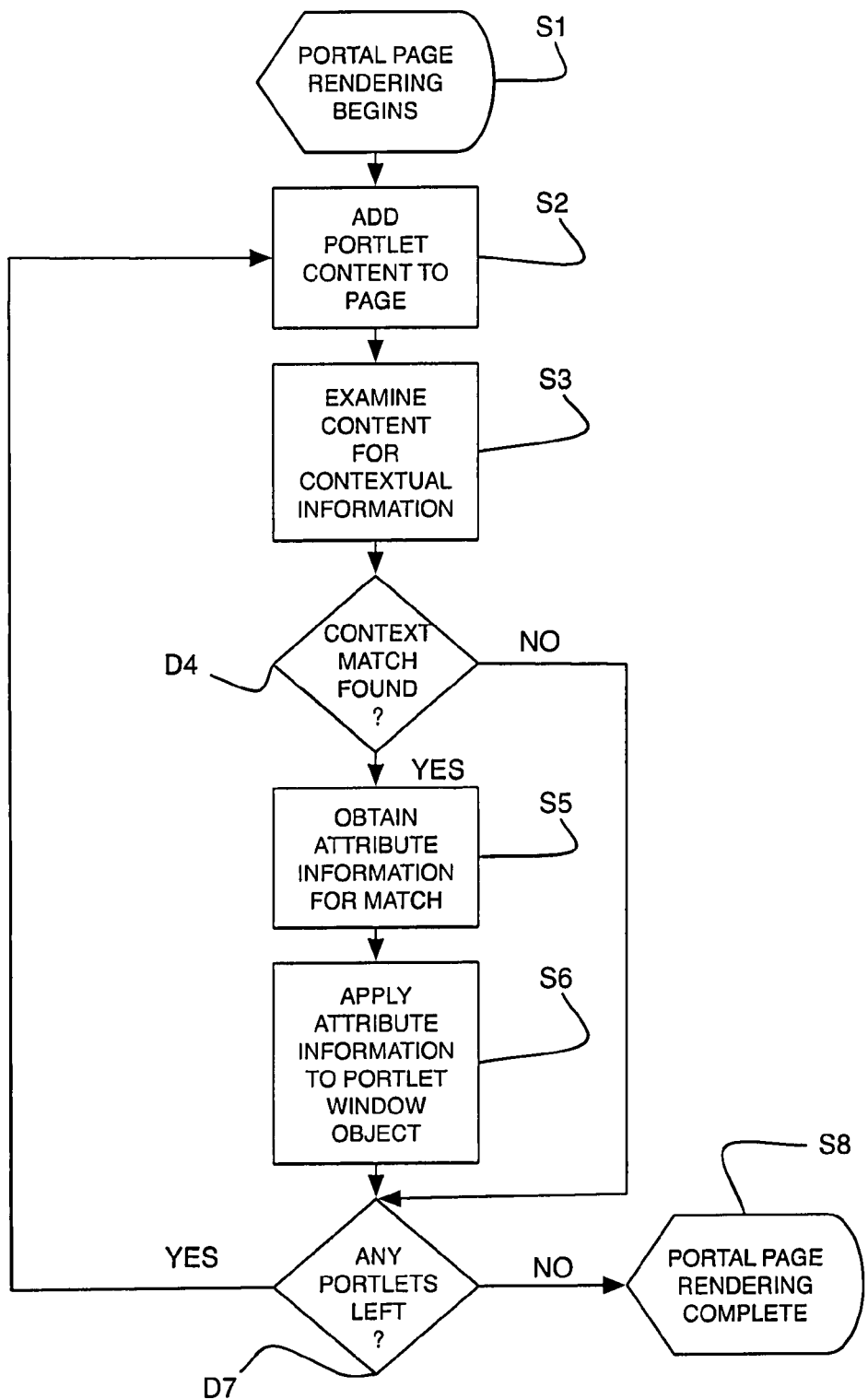
FIG. 4 shows a process flow for providing dynamically configurable portlets according to an embodiment of the invention.

Now referring to FIGS. 3 and 4 concurrently, a method of automatically configuring portlets 50 starts at S1 wherein a portal page 40 rendering is begun. At S2 portlet 50 content is added to the portal page 40. At S3 the context gathering module 32 examines the portlet 50 for any contextual aspect(s). For example, the module 32 may examine the portlet 50 content for contextual information (e.g., word, phrase, image, indicia, etc.). At D4 the context gathering module 32 verifies if any contextual aspect has been discovered. If not (i.e., D4 is "no"), then the method proceeds to D7 to verify if additional portlets 50 remain to be rendered on the portal page 40. If a contextual aspect has been discovered (i.e., D4 is "yes"), then at S5 the attribute adjusting module 34 obtains, for example, from user profile 80, any attribute information for the discovered contextual aspect ("contextual match"). At S6 the rendering module 36 applies any attribute information to the portlet 50 window object. D7 acts as a looping mechanism to verify that all portlets 50 applicable to the particular portal page 40 are reviewed in this manner (e.g., S2 through S6) so that the portlets 50 and concomitantly the portal page 40 are fully prepared for rendering. Upon the completion of D7 (i.e., D7 is "no") and no further portlets 50 require review, then S8 indicates the portal page 40 rendering is complete.

Various contextual information may be obtained from the portlet 50 by the context gathering module 32. The contextual information that is sought to be perused may be stored in user profile 80. The contextual aspect may be include a particular a word, an amount, a phrase, an image, in any quantity. Similarly, the contextual aspect may be the lack of a certain word, phrase, and/or image. In this manner, the context gathering module 32 is able to discern for the user 16 (FIG. 1) the content of the portlet 50. The user 16 may edit, adjust, add, and/or delete any of the contextual information over time.

For example, the user 16 may want to know if certain specific words are in the particular portlet 50. Similarly, the user 16 may want to know if a certain portlet 50 providing stock prices, has a certain stock of interest whose price has attained a certain price. Another example, may be that the user 16 may wish to know if a certain portlet 50, for example a news portlet is no longer providing information on a certain topic of news. In any event, via aspects of the invention, the content and context of a portlet 50 is obtained.

Similarly, various attribute information may be considered for adjustment with the portlet including container size, font size, container shape, color, transparency, or combinations thereof. For example, as FIG. 5 shows, once contextual information is identified, then at least one attribute may be applied for adjustment. The first (upper) portlet 50 shows how the text ("Text Size 16") has increased in size from the previous text ("Text Size 12") and the image size has shrunk from the previous image size in the portlet 50. The increase in text size may signify, for the user 16, the heightened importance of the particular content of the portlet 50. Similarly, the second (middle) portlet 50 shows how a portion of the portlet 50 (e.g., text, background, image, and/or combination) has undergone a color change. In the illustration portions of the portlet 50 are rendered in the color yellow (notated as "color 'yellow'"). Additionally, shading, transparency, and/or opacity may be similarly employed as an attribute to signify content. Also, the third (lower) portlet 50 shows how the entire container size of the portlet 50 has changed (e.g., increased) to signify a contextual aspect.

Figure 6A:
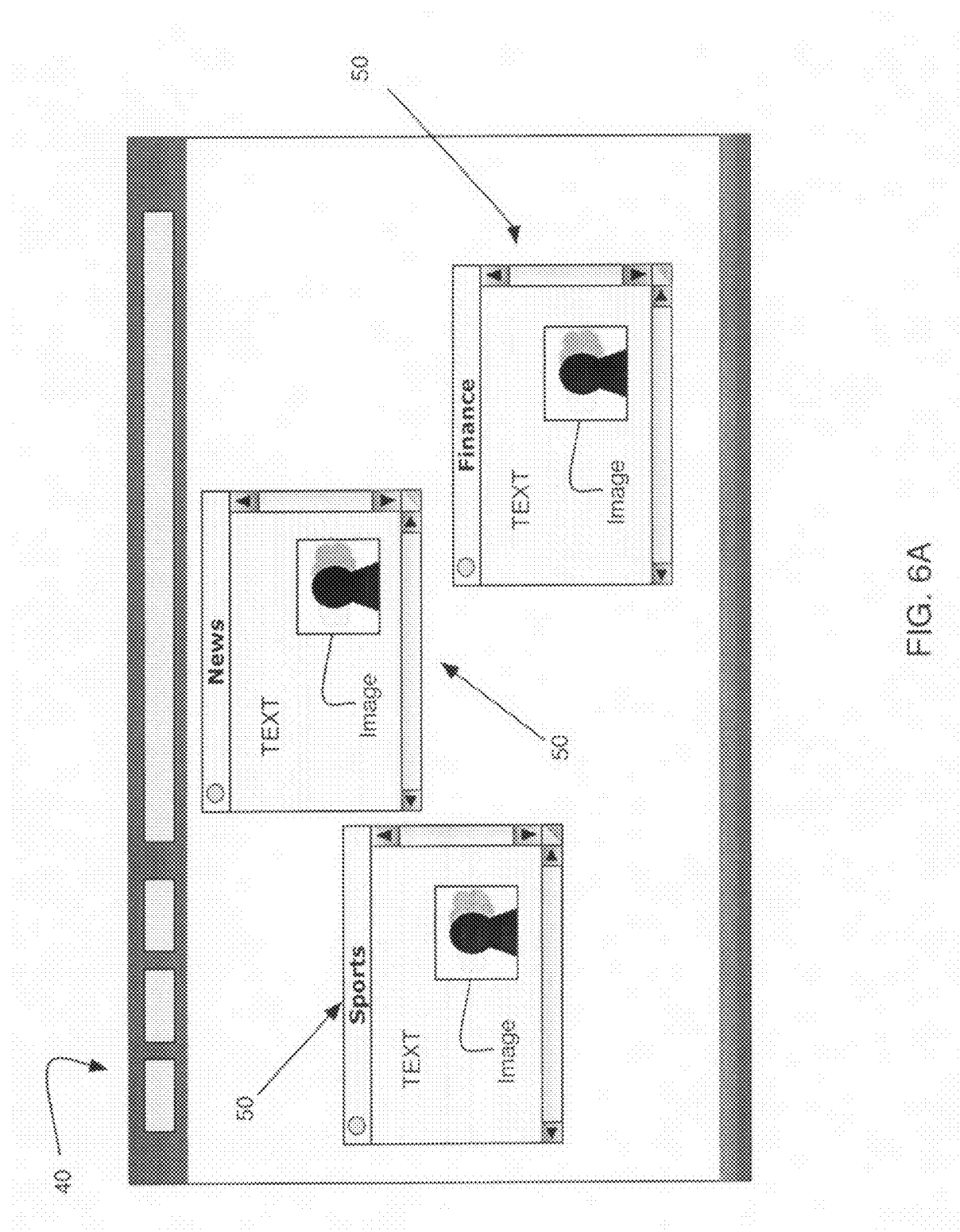
FIGS. 6A-6C show various portals and portlets according to embodiments of the invention.
Figure 6B:
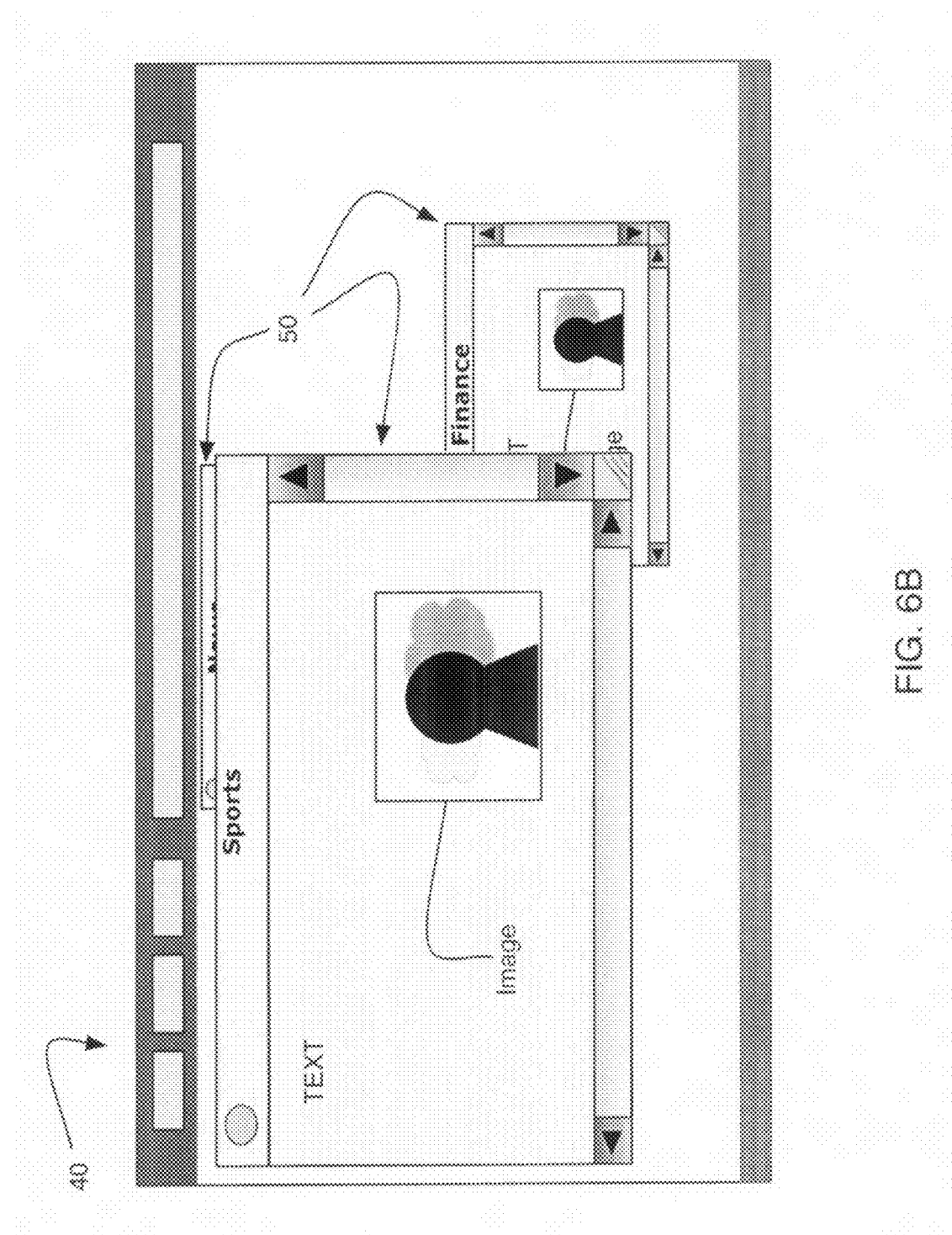
Figure 6C:
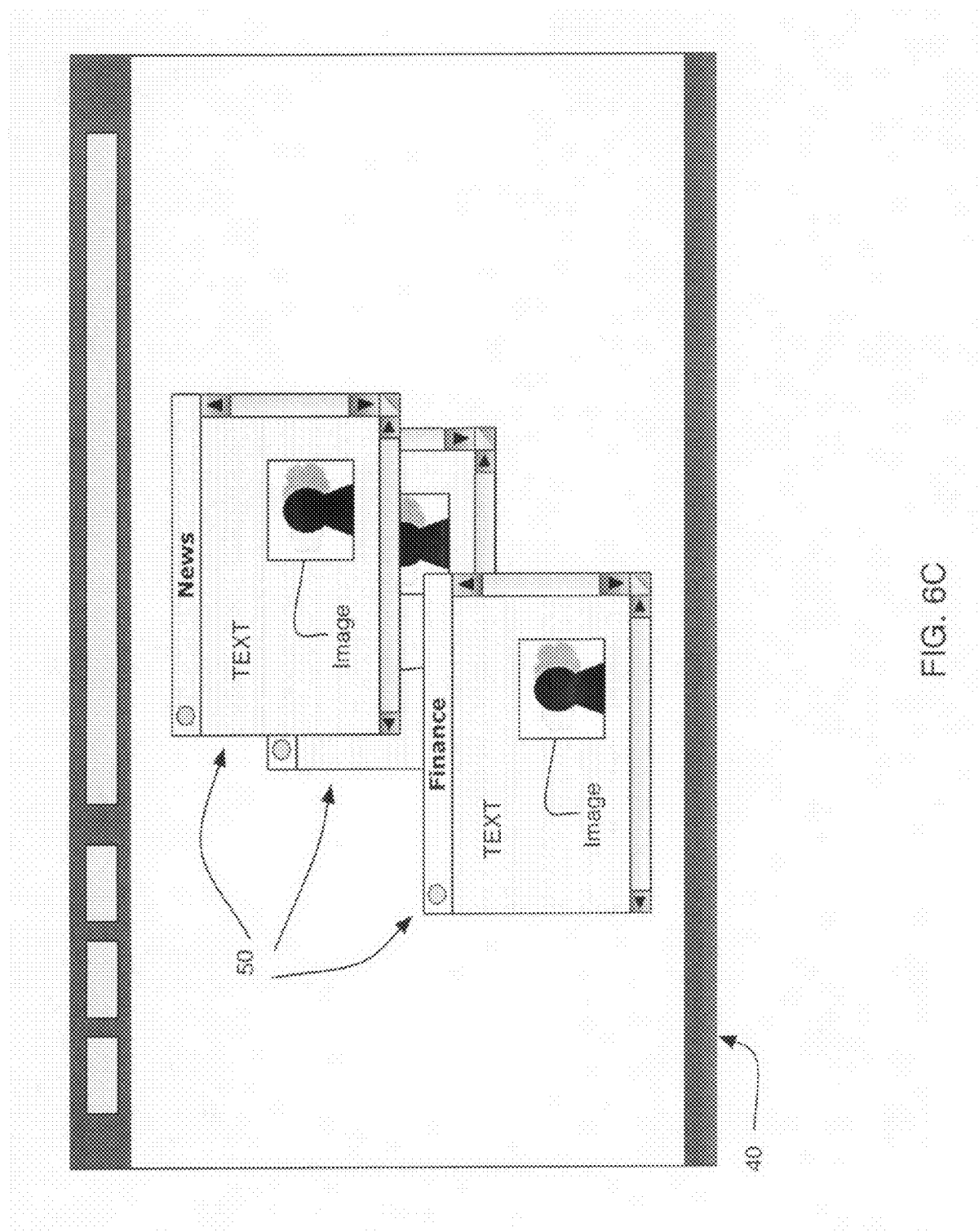

FIGS. 6A through 6C show another embodiment wherein the attribute information may include modifying the portlet 50 in relationship to another portlet(s) 50. As shown, three portlets 50 (e.g., "Sports", "News", "Finance") are rendered on the portal page 40. The portlets 50 may be moved in their respective locations to each other and/or have another attribute(s) altered based upon content obtained as shown in FIG. 6B. For example, perhaps the user's favorite team won the ballgame the previous day, thus the "Sports" portal 50 (e.g., displaying an article of the team's win) increases in container size so as to block out the other portals 50 (i.e., "News" and "Finance"). Similarly, FIG. 6C shows a readjustment of the positioning of the portals 50. In this example, perhaps the content obtained is that it is a Tuesday, and during Tuesdays for the particular user 16, sports is not as important as "News" and "Finance".

Figure 7:
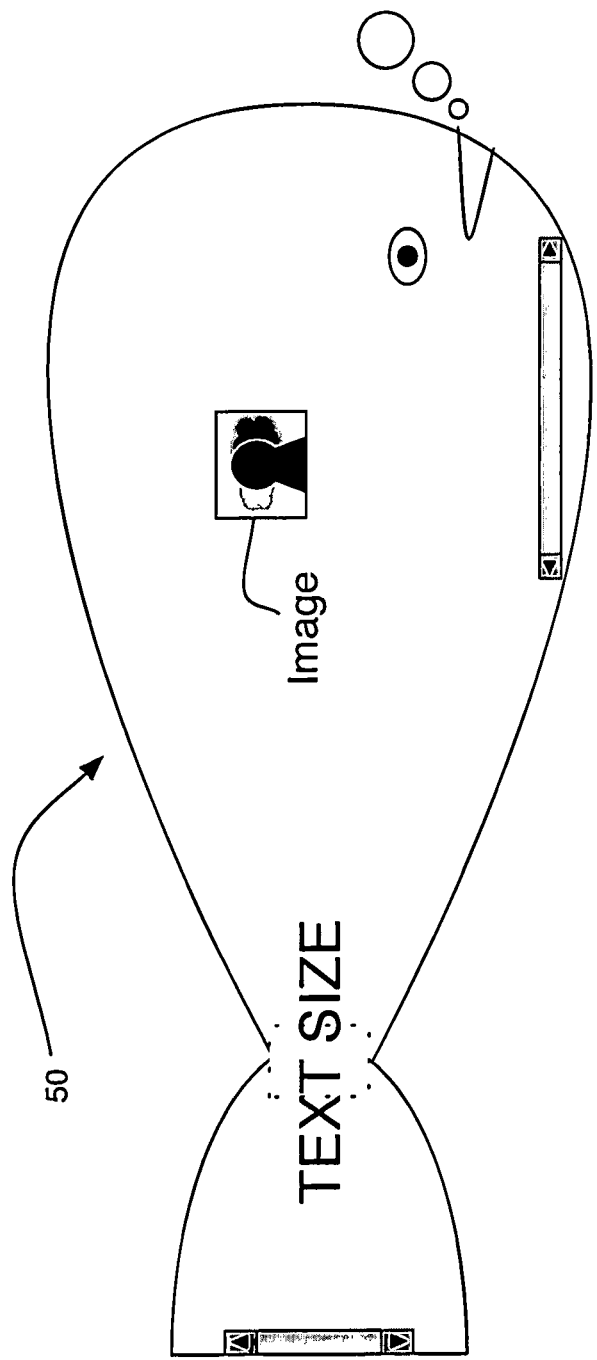
FIG. 7 shows a portlet according to an embodiment of the invention.

FIG. 7 shows another embodiment wherein the shape of the container of the portlet 50 is altered based on content. For example, for a child-appropriate portlet 50 content, the shape of the container is of a whale. Clearly, a near infinite variety of shapes, configurations, and/or outlines may be employed for the portlet 50 and its text and/or image(s). For example, virtually any non-rectangular container shape may be used. In other embodiments, the portlet 50 may be non-contiguous, wherein, for example, one portion is rectangular while a second portion is non-rectangular.

FIGS. 8A and 8B show other embodiments for portlets 50. As shown, a musical note (FIG. 8A) may connote a portlet 50 having musical content and a heart (FIG. 8B) may connote a portlet 50 having personal ads. In any event, FIGS. 8C and 8D show a configuration change caused by a change in content as discerned by the invention. For example, the added musical note outline in FIG. 8C may connote an increase in album sales over the previously shown in FIG. 8A in a situation where the portlet 50 is a music sales site. Similarly, FIG. 8D, with the broken heart may connote the lack of receiving any replies to a personal ad placed by the user 16. Although not shown, the heart outline could grow to signify the personal ad was replied to and/or a certain quantity of replies were obtained.

Figure 9A:
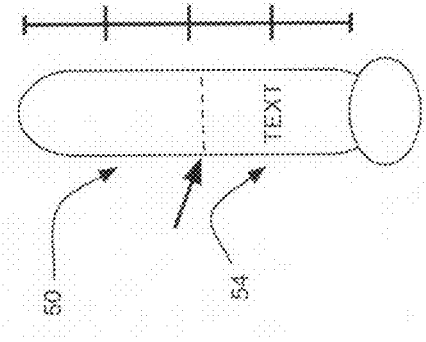
FIGS. 9A-9B show various portlets according to embodiments of the invention.
Figure 9B:
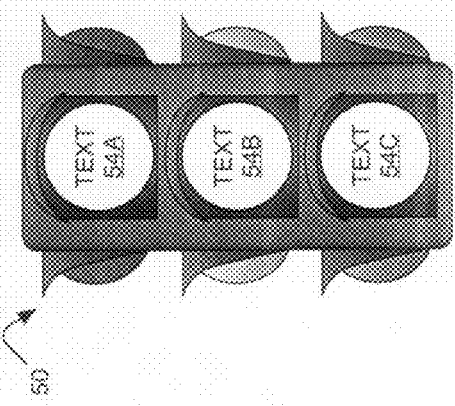

FIGS. 9A and 9B show another embodiment of the invention wherein the position of the portlet 50 information (e.g., text, image, and/or the like) is adjusted based on the content. FIG. 9A is an illustration of a thermometer outline as the portlet 50 wherein the text 54 is rising to a certain level, akin to the mercury in a thermometer, to connote certain contextual aspects (e.g., importance). Similarly, FIG. 9B which illustrates a traffic light for the portlet 50 could show the text portions 54A, 54B, 54C in various locations on the portlet 50 similar to a red, yellow, or green light in the traffic light. In this manner, a user 16 could quickly discern content aspects of the portlet 50 based solely on its display location within the container of the portlet 50. For example, a red light location for text 54A may connote an adult-oriented content in the particular portlet 50, while a green light location for text 54C would connote a child-approved content for the particular portlet 50.

Figure 10A:
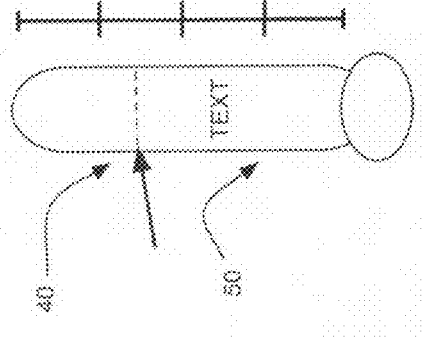
FIGS. 10A-10B show various portals and portlets according to embodiments of the invention.
Figure 10B:
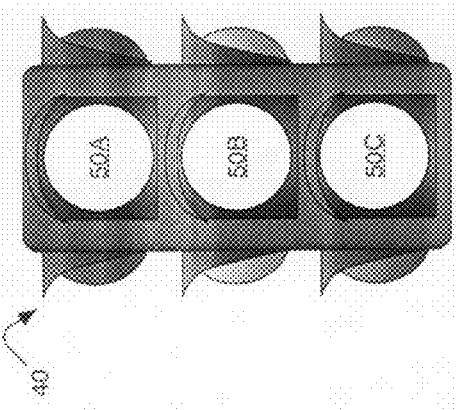

In another embodiment the attribute information may include adjusting the portlet 50 in relationship to the portal 40. FIGS. 10A and 10B show instead unique portal pages 40 wherein the location of the portlet(s) 40 within the portal page 40 similarly conveys content information. In any event, the various embodiments are able to effectively provide a dynamically configurable portlet 50.

In another embodiment, the invention provides a computer program stored on a computer-readable medium, which when executed, enables a computer system to configure portlets. To this extent, the computer-readable medium includes program code, such as portlet configuring component 30 (FIG. 1), which implements the process described herein. It is understood that the term "computer-readable medium" comprises one or more of any type of tangible medium of expression capable of embodying a copy of the program code (e.g., a physical embodiment). In particular, the computer-readable medium can comprise program code embodied on one or more portable storage articles of manufacture, on one or more data storage portions of a computing device, such as memory 22A (FIG. 1) and/or storage system 22B (FIG. 1), as a data signal traveling over a network (e.g., during a wired/wireless electronic distribution of the computer program), on paper (e.g., capable of being scanned and converted to electronic data), and/or the like.

In another embodiment, the invention provides computer software embodied in at least one propagated signal for automatically configuring a portlet, the at least one propagated signal comprising instructions for causing at least computer system to: receive a portlet; search content of the portlet for a contextual aspect; and automatically apply attribute information to a portlet window object based on a discovered contextual aspect.

In another embodiment, the invention provides a method of generating a system for configuring a portlet. In this case, a computer system, such as computer system 12 (FIG. 1), can be obtained (e.g., created, maintained, having made available to, etc.) and one or more programs/systems for performing the process described herein can be obtained (e.g., created, purchased, used, modified, etc.) and deployed to the computer system. To this extent, the deployment can comprise one or more of: (1) installing program code on a computing device, such as computing device 14 (FIG. 1), from a computer-readable medium; (2) adding one or more computing devices to the computer system; and (3) incorporating and/or modifying one or more existing devices of the computer system, to enable the computer system to perform the process described herein.

In still another embodiment, the invention provides a business method that manages a method for configuring a portlet, which enables users to perform the process described herein on a subscription, advertising, and/or fee basis. That is, a service provider could offer to manage a network and/or a computer system 12 (FIG. 1) that configures portlets as described herein. In this case, the service provider can manage (e.g., create, maintain, support, etc.) a virtual and/or physical network that enables users to communicate content using computer systems, such as computer system 12, that perform the process described herein. In return, the service provider can receive payment from the user(s) under a subscription and/or fee agreement, receive payment from the sale of advertising to one or more third parties, and/or the like.

As used herein, it is understood that "program code" means any set of statements or instructions, in any language, code or notation, that cause a computing device having an information processing capability to perform a particular function either directly or after any combination of the following: (a) conversion to another language, code or notation; (b) reproduction in a different material form; and/or (c) decompression. To this extent, program code can be embodied as any combination of one or more types of computer programs, such as an application/software program, component software/a library of functions, an operating system, a basic I/O system/driver for a particular computing, storage and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method of automatically configuring a portlet, the method comprising:
   receiving a portlet with content to be rendered as a portlet window object within a portal;
   examining the content of the portlet for discovering a contextual aspect; and
   automatically adjusting at least one attribute of the portlet window object based on the discovered contextual aspect.

2. The method of claim 1, further comprising rendering the portlet window object on a portal page.

3. The method of claim 1, further comprising adding the portlet content to a portal page.

4. The method of claim 1, wherein the attribute information comprises one of:
   container size, font size, container shape, color, or transparency.

5. The method of claim 1, wherein the applying attribute information further comprises modifying the portlet window object.

6. The method of claim 1, wherein the applying attribute information includes modifying the portlet in relationship to another portlet.

7. The method of claim 1, wherein the applying attribute information includes adjusting the portlet in relationship to the portal.

8. The method of claim 1, wherein the applying attribute information includes adjusting an appearance of the portlet to signify a content of the portlet.

9. The method of claim 1, wherein one of the contextual aspect and the attribute information are user editable.

10. The method of
    claim 1, wherein the attribute of the portlet is adjusted so that the portlet is rendered in a non-rectangular container shape.

11. The method of claim 1, wherein the contextual aspect is at least one selected from the group consisting of: word count, a word, an amount, a phrase, phrase count, an image, an omitted word, and an omitted phrase.

12. A method of automatically configuring a portlet, the method comprising:
    receiving a plurality of portlets each with content to be rendered as a portlet window object within a portal page;
    examining the content of each of the plurality of portlets for discovering a contextual aspect;
    automatically adjusting at least one attribute of the portlet window object based on the discovered contextual aspect; and
    rendering the plurality of portlets on the portal page.

* * * * *